(12) United States Patent
Fichera

(10) Patent No.: US 7,757,913 B2
(45) Date of Patent: Jul. 20, 2010

(54) DETACHABLE BELT CLIP INTERFACE MECHANISM FOR PHONE HOLSTERS AND WIRELESS PHONE HOLSTER ASSEMBLY

(75) Inventor: Brandon Fichera, Boulder, CO (US)

(73) Assignee: Kyocera Corporation, Kyoto (JP)

( * ) Notice: Subject to any disclaimer, the term of this patent is extended or adjusted under 35 U.S.C. 154(b) by 1486 days.

(21) Appl. No.: 11/113,669

(22) Filed: Apr. 25, 2005

(65) Prior Publication Data

US 2006/0237494 A1    Oct. 26, 2006

(51) Int. Cl.
*A45F 5/02* (2006.01)
*A45F 3/00* (2006.01)
*A45F 1/04* (2006.01)

(52) U.S. Cl. ........................ 224/197; 224/666; 224/669; 224/929; 224/930

(58) Field of Classification Search ................. 224/197, 224/269, 669, 666, 929, 930; 248/314, 220.21, 248/224.8; 403/353
See application file for complete search history.

(56) References Cited

U.S. PATENT DOCUMENTS

| | | | |
|---|---|---|---|
| 4,858,798 A * | 8/1989 | Siddoway et al. | 224/242 |
| 6,405,910 B1 * | 6/2002 | Infanti et al. | 224/668 |
| 2006/0058070 A1 * | 3/2006 | Chang | 455/569.1 |

* cited by examiner

*Primary Examiner*—Nathan J Newhouse
*Assistant Examiner*—Adam Waggenspack

(57) ABSTRACT

A wireless phone holster assembly includes a wireless phone holster for carrying a wireless phone, the wireless phone holster including a slotted engagement section; a belt clip; and an interface member including a protrusion configured for engagement with and disengagement from the slotted engagement section to securely attach or detach the engagement section of the wireless phone holster with wireless phone to and from the belt clip.

8 Claims, 3 Drawing Sheets

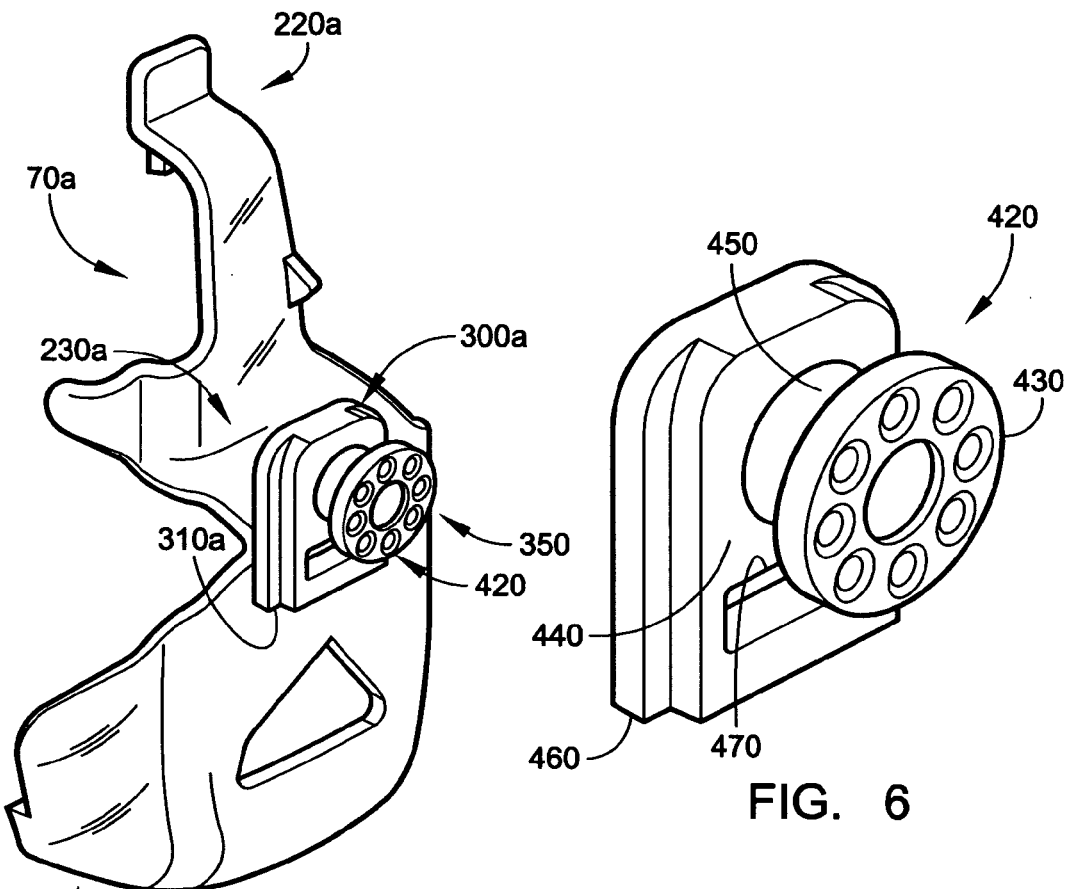
FIG. 5
FIG. 6
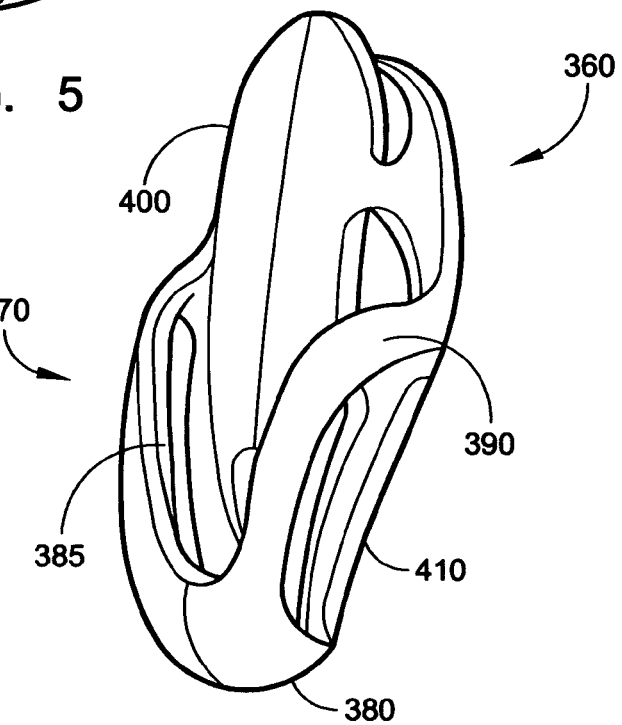
FIG. 7

DETACHABLE BELT CLIP INTERFACE MECHANISM FOR PHONE HOLSTERS AND WIRELESS PHONE HOLSTER ASSEMBLY

FIELD OF THE INVENTION

The present invention generally relates, in general to holster and belt clip assemblies for carrying wearable accessories, and, in particular, to phone holster and belt clip assemblies.

BACKGROUND OF THE INVENTION

It is common for a wireless phone (e.g., cell phone) user to carry the wireless phone on one's belt using a phone holster and belt clip assembly. The wireless phone is much more accessible and comfortable to the user when the wireless phone is attached to the user's belt compared to storing the wireless phone in one's pant pocket, or other location. A problem with many phone holster and belt clip assemblies is that the phone holster and belt clip are integrally attached, and, not separable. As a result, the user can not separate the holster with phone from the belt clip in situations where this would be convenient.

SUMMARY

Thus, an aspect of the present invention relates to a wireless phone holster assembly including a wireless phone holster for carrying a wireless phone, the wireless phone holster including a slotted engagement section; a belt clip; and an interface member including a protrusion configured for engagement with and disengagement from the slotted engagement section to securely attach or detach the engagement section of the wireless phone holster with wireless phone to and from the belt clip.

Another aspect of the invention involves a detachable belt clip interface mechanism for attaching and detaching a wireless phone holster and wireless phone to and from a belt clip. The detachable belt clip interface mechanism includes a slotted engagement section of a wireless phone holster; and an interface member including a protrusion configured for engaging the slotted engagement section to securely attach the belt clip engagement section of the wireless phone holster with wireless phone to the belt clip.

A further aspect of the invention involves a wireless phone holster assembly includes a wireless phone holster for carrying a wireless phone; a belt clip; and means for engaging and disengaging the wireless phone holster to and from the belt clip while the wireless phone is maintained in the wireless phone holster.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is a perspective view of another embodiment of a detachable belt clip interface mechanism shown in conjunction with a phone holster pocket.

FIG. 6 is an enlarged perspective view of a generic hub interface member of the detachable belt clip interface mechanism illustrated in FIG. 5.

FIG. 7 is a front perspective view of an embodiment of a belt clip that may be used with the detachable belt clip interface mechanism illustrated in FIGS. 5 and 6.

DETAILED DESCRIPTION

Figure 1:
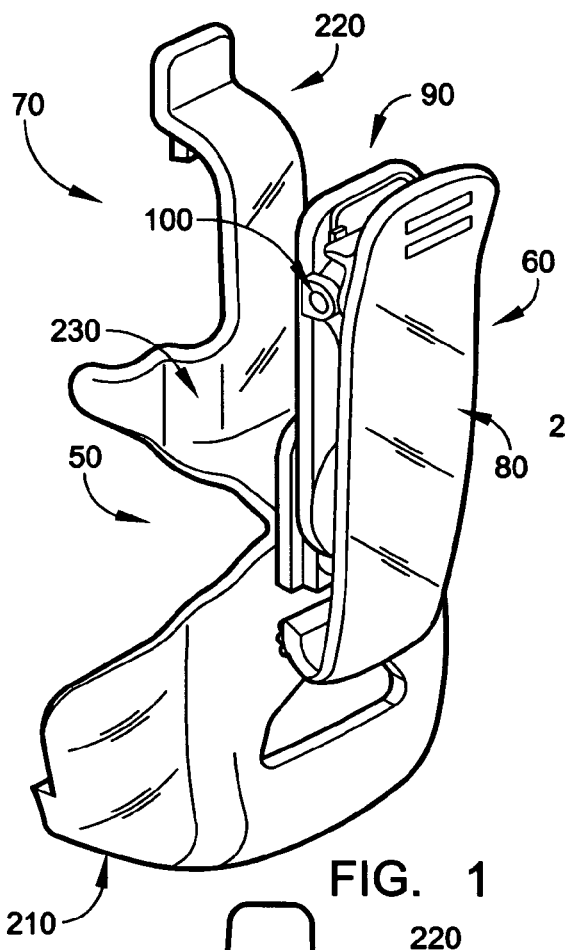
FIG. 1 is a perspective view of an embodiment of a belt clip, a wireless phone holster pocket, and a detachable belt clip interface mechanism.
Figure 2:
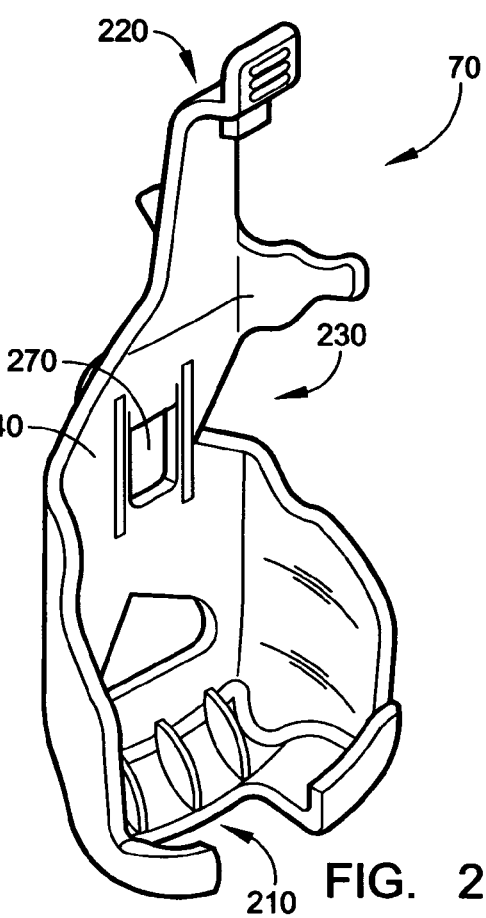
FIG. 2 is a front perspective view of the wireless phone holster pocket illustrated in FIG. 1.
Figure 3:
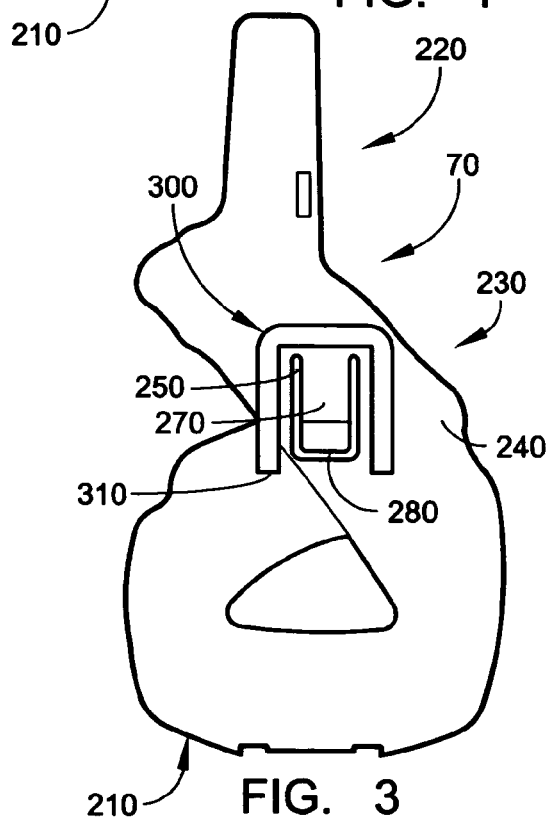
FIG. 3 is a rear elevational view of the wireless phone holster pocket illustrated in FIGS. 1 and 2.
Figure 4:
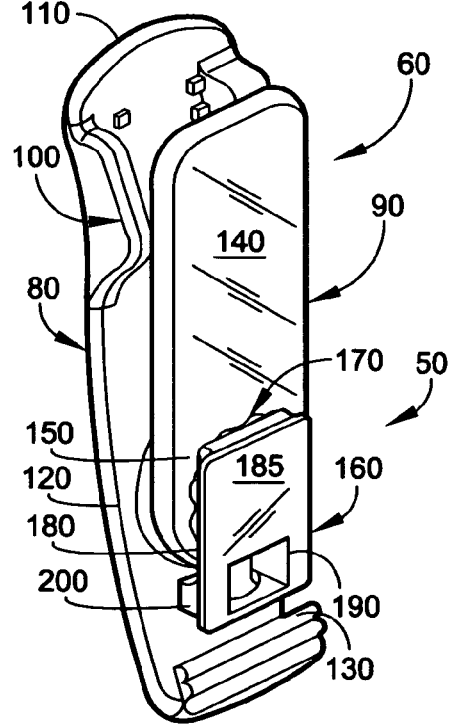
FIG. 4 is a front perspective view of the belt clip illustrated in FIG. 1.

With reference to FIGS. 1-4, an embodiment of a wireless phone holster assembly including a detachable belt clip interface mechanism 50 that allows one to securely attach and remove a phone holster pocket 70 to/from a belt clip 60 will now be described. The detachable belt clip interface mechanism 50 allows the user to detach a phone holster pocket 70 from the belt clip 60 while allowing the phone to stay in the holster pocket 70. Although the detachable belt clip interface mechanism 50 will be described in conjunction with a phone holster pocket 70, the holster pocket 70 or a similar type of holster may be used to carry other wearable phone accessories or other wearable accessories. The detachable belt clip interface mechanism 50 may also apply to cases or other carrying solutions. Thus, the detachable belt clip interface mechanism 50 may be used with wearable phones, wearable phone accessories, other wearable accessories, or other accessories.

The belt clip 60 of the wireless phone holster assembly includes an elongated arm 80 and pivot member 90 pivotally connected to each other through a pivot and spring mechanism 100. The elongated arm 80 includes an upper thumb portion 110, and an elongated lower portion 120 with a lower hook 130. The pivot member 90 includes a support plate 140 with a lower interface support section 150. An interface member 160 of the detachable belt clip interface mechanism 50 is connected to the interface support section 150 via a coupling assembly 170. A rectangular flange 180 extends outwardly from the coupling assembly 170. An upper section of the interface member 160 includes a flat surface 185. A lower section of the interface member 160 includes a rectangular hole 190 flanked by a pair of opposite foot extensions 200. The opposite foot extensions 200 provide a stop for the belt clip 60 to prevent it from rotating more than +/−90 degrees. In an alternative embodiment of the interface member 160, the interface member 160 does not include the opposite foot extension 200, allowing the belt clip to rotate 360 degrees.

The phone holster pocket 70 of the wireless phone holster assembly includes a lower support section 210 and an upper attachment section 220 connected by a belt clip engagement section 230. The belt clip engagement section 230 includes a substantially flat engagement wall 240 with a U-shaped slot 250 that, in part, defines a flexible, resilient arm 270. The arm 270 includes a rearwardly angled lower section 280. A rear of the belt clip engagement section 230 includes an upside-down, U-shaped receiving member 300 having a correspondingly shaped receiving slot 310.

The detachable belt clip interface mechanism 50 for securely attaching and removing the phone holster pocket 70 to/from the belt clip 60 while allowing the wireless phone to stay in the holster pocket 70 will now be described in use. In order to attach the holster pocket 70 to the belt clip 60, the holster pocket 70 is moved downwardly relative to the belt clip 60 so that the upside-down U-shaped slot 310 of the receiving member 300 on the holster pocket 70 is slid onto the rectangular flange 180 of the interface member 160 of the belt clip 60. As the receiving member 300 is slid onto the interface member 160, the angled lower section 280 of the arm 270 slides against the flat rear surface 185 of the interface member 160, urging the flexible, resilient arm 170 forwardly, until the angled lower section 280 of the arm 270 is over the rectangular hole 190. Once the angled lower section 280 is over the rectangular hole 190 of the interface member 160, the arm 270 urges the angled lower section 280 into the rectangular hole 190, helping to maintain the belt clip 60 locked into the holster pocket 70.

In order to remove the holster pocket 70 from the belt clip 60 with the wireless phone in the holster pocket 70, the holster pocket 70 is pulled upwardly relative to the belt clip 60. This causes the upside-down U-shaped slot 310 of the receiving member 300 to be slid off of the rectangular flange 180 of the interface member 160. Once the receiving member 300 is completely slid off of the rectangular flange 180, the holster pocket 70 may be removed from the belt clip 60 with the wireless phone in the holster pocket 70.

A significant benefit is that once the holster pocket 70 is removed from the belt clip 60, the user may attach the holster pocket 70 to something other than the belt clip 60. For example, but not by way of limitation, other items the holster pocket 70 may attach to are a car mount, a suction cup mount, a mount with a carabineer for attachment to a backpack, and a purse strap. One of these other items would include an interface member 160 or similar connector for attaching the holster pocket 70 thereto.

With reference to FIGS. 5-7, another embodiment of a wireless phone holster assembly including a detachable belt clip interface mechanism 350 that allows one to securely attach and remove a holster pocket 70a to/from a belt clip 360, while allowing the phone or other wearable accessory to stay in the holster pocket 70a, will now be described. The holster pocket 70a is the same as the holster pocket 70 described above, and, therefore, will not be described in further detail. Similar elements to the phone holster pocket 70 shown and described above will be referred to with like reference numbers, but with an "a" subscript.

The belt clip 360 includes a pocket 370 with a lower curved support section 380 having a elongated front recess 385, upwardly and rearwardly curved arms 390, vertical support plate 400, and clip member 410 for clipping the belt clip 360 to a user's belt.

A generic hub interface member 420 of the detachable belt clip interface mechanism 350 includes wheel-shaped hub 430 connected to a substantially rectangular support member 440 by a shaft 450. A rectangular flange 460 extends outwardly from the support member 440. An upper section of the support member 440 includes a flat surface (not shown) similar to flat surface 185 shown and described above with respect to FIG. 4. A lower section of the support member 440 includes a rectangular hole 470.

The detachable belt clip interface mechanism 350 for securely attaching and removing the holster pocket 70a to/from the belt clip 360 while allowing the wireless phone or other wearable accessory to stay in the holster pocket 70a will now be described in use.

In order to attach the holster pocket 70a to the belt clip 360, first, the upside-down U-shaped slot 310a of the receiving member 300a on the holster pocket 70a is slid onto the rectangular flange 460 of the generic hub interface member 420 in a manner similar to attaching the interface member 160 and receiving member 300 as described above with respect to FIGS. 1-4. Once the generic hub interface member 420 is attached to the holster pocket 70a, the wheel-shaped hub 430 (w/ attached holster pocket 70a) is lowered into the pocket 370 of the belt clip 360. As the hub 430 is lowered into the pocket 370, the shaft 450 slides down/through the elongated recess 385. When the hub 430 is fully lowered into the pocket 370, the lower curved support section 380 retains the hub 430 within the pocket 370.

In order to remove the holster pocket 70a from the belt clip 360 with the wireless phone or other wearable accessory in the holster pocket 70a, the holster pocket 70a is pulled upwardly relative to the belt clip 360. This causes the shaft 450 of the generic hub interface member 420 to slide up/through the elongated recess 385 and causes the hub 430 to move vertically up and out of the pocket 370. Once the hub interface member 420 is completely slid out of the pocket 370 so that the hub 430 is no longer blocked by the upwardly and rearwardly curved arms 390, the holster pocket 70a may be removed from the belt clip 360.

Once the holster pocket 70a is removed from the belt clip 360, the user may attach the holster pocket 70a (with or without interface member 420) to something other than the belt clip 360 (e.g., a car mount, suction cup mount, mount with a carabineer for attachment to a backpack, purse strap). One of these other items may include an interface member 420 or similar connector for attaching the holster pocket 70a thereto. Alternatively, if the holster pocket 70a includes the interface member 420 with generic hub 430, these other items may include a pocket 370 or similar structure for attaching the holster pocket 70a thereto.

Figure 8:
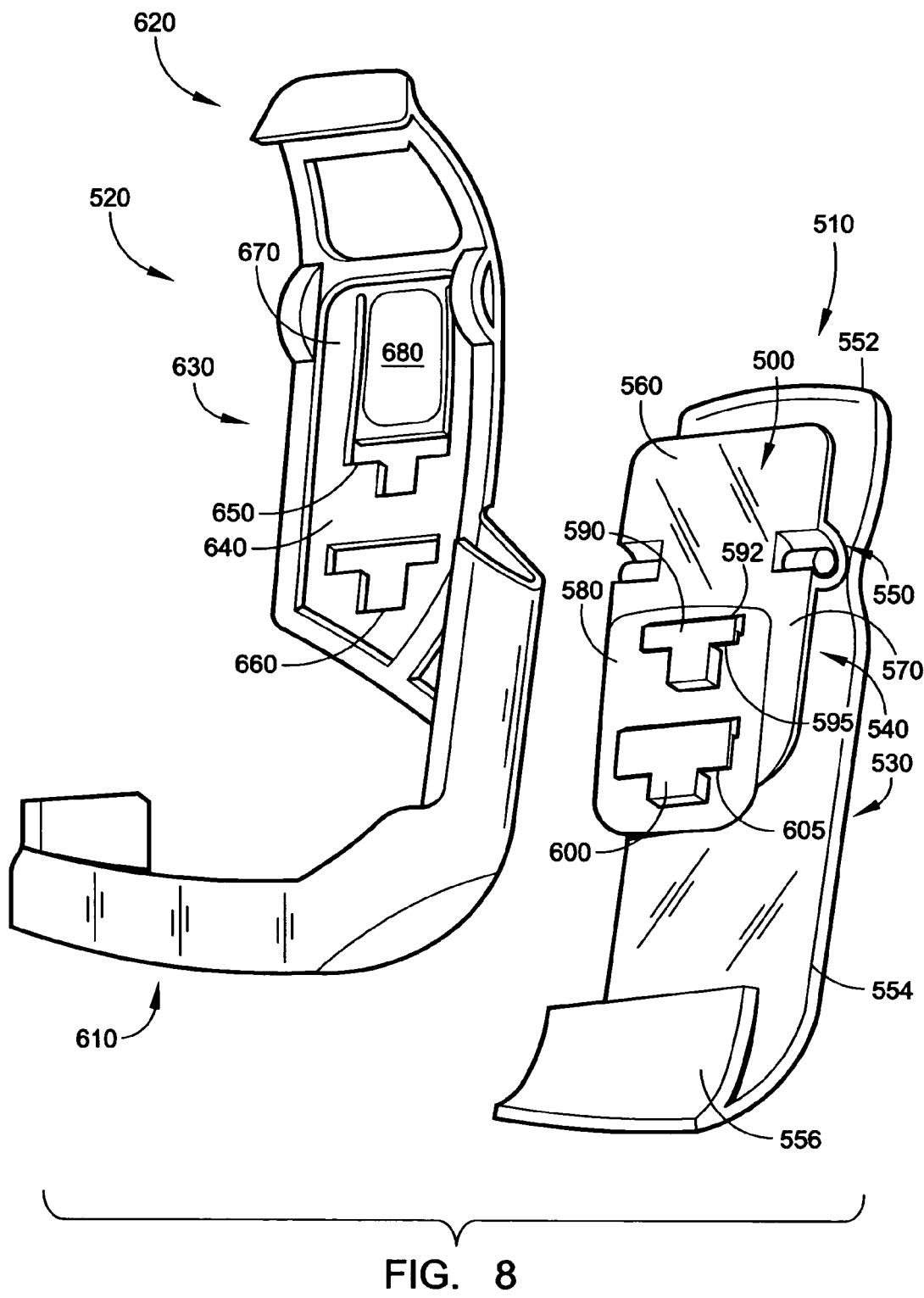
FIG. 8 is a front perspective view of a further embodiment of a detachable belt clip interface mechanism shown in conjunction with a belt clip and a wireless phone holster pocket.

With reference to FIG. 8, a further embodiment of a wireless phone holster assembly including a detachable belt clip interface mechanism 500 that allows one to securely attach and remove a holster pocket 520 to/from a belt clip 510 while allowing the phone or other wearable accessory to stay in the holster pocket 520 will now be described.

The belt clip 510 includes an elongated arm 530 and a pivot member 540 pivotally connected to each other through a pivot and spring mechanism 550. The elongated arm 530 includes a grippable upper portion 552, and an elongated lower portion 554 with a support section 556.

The pivot member 540 includes an upper thumb section 560 and a lower support surface 570. A movable interface member 580 is slidably attached to the lower support surface 570. A spring mechanism (not shown) may urge the interface member 580 upwardly. The interface member 580 includes an upper T-shaped member 590 with a chamfer surface 592 and a ledge catch 595. A lower T-shaped member 600 includes a ledge catch 605.

The phone holster pocket 520 includes a lower support section 610, and an upper attachment section 620 connected by a belt clip engagement section 630. The belt clip engagement section 630 includes a substantially flat engagement wall 640 with an upper T-shaped hole 650 and a lower T-shaped hole 660. The engagement wall 640 includes opposite parallel elongated slots 670 extending upwardly from the T-shaped hole 650. The slots 670, in part, define a flexible arm 680.

The detachable belt clip interface mechanism 500 for securely attaching and removing the holster pocket 520 to/from the belt clip 510 while allowing the wireless phone or other wearable accessory to stay in the holster pocket 520 will now be described in use.

In order to attach the holster pocket 520 to the belt clip 510, the holster pocket 520 is moved rearward in the orientation shown in FIG. 8 so that the two T-shaped holes 650, 660 of the holster pocket 520 are placed over the corresponding two T-shaped members 590, 600 of the belt clip 510. The chamfer surface 592 of the top T-shaped member 590 deflects the flexible resilient arm 680 of the holster pocket 520. When the ledge catches 595, 605 of the T-shaped members 590, 600 clear the thickness of the engagement wall 640, the movable interface member 580 and the T-shaped members 590, 600 are together pushed vertically downward. When this occurs, the resilient arm 680 on the holster pocket 520 returns to its natural position and vertically locks the belt holster pocket 520 into place on the belt clip 510. The specific geometry of the T-shaped members 590, 600 on the interface member 580 and the T-shaped holes 650, 660 in the holster pocket 520 prevent the holster pocket 520 from moving side-to-side and front-to-back relative to the belt clip 510.

In order to remove the holster pocket 520 from the belt clip 510 with the wireless phone or other wearable accessory in the holster pocket 520, the movable interface member 580 is pushed vertically upward, and the upper attachment section 620 of the holster pocket 520 is angled away from the user and the belt clip 510 as pressure is maintained upwardly on the interface plate 580. This allows the chamfer surface 592 of the upper T-shaped member 590 to clear the bottom of the arm 680 so that the T-shaped members 590, 600 can be removed from the T-shaped holes 650, 660. The holster pocket 520 and the wireless phone or other wearable accessory are then removed from the belt clip 510.

Once the holster pocket 520 is removed from the belt clip 510, the user may attach the holster pocket 520 to something other than the belt clip 510 (e.g., a car mount, suction cup mount, mount with a carabineer for attachment to a backpack, purse strap). One of these other items may include an interface member 580 or similar connector for attaching the holster pocket 520 thereto.

The detachable belt clip interface mechanisms 50, 350, 500 shown herein and described above allow a belt clip to be securely attached to and removed from a phone holster pocket while allowing a wireless phone to stay in the holster pocket.

While the particular mechanisms and assemblies herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art having the benefit of this disclosure and that the scope of the present invention is accordingly limited by nothing other than the appended claims.

What is claimed is:

1. A wireless phone holster assembly for carrying a wireless phone, wherein the wireless phone holster assembly is independent of the wireless phone, the wireless phone holster assembly comprising:
    a wireless phone holster for carrying a wireless phone, the wireless phone holster including a slotted engagement section;
    a belt clip;
    an interface member including protrusions configured for engagement with and disengagement from the slotted engagement section to securely attach or detach the engagement section of the wireless phone holster with wireless phone to and from the belt clip,
    wherein the slotted engagement section includes a pair of T-shaped slots in vertical alignment, and the protrusions of the interface member includes a pair of T-shaped members in vertical alignment received in the T-shaped slots, at least one of the T-shaped members includes a chamfer surface, and the engagement section includes a flexible resilient arm that is deflectable by the chamfer surface so as to cause the interface member with T-shaped members to move relative to the slotted engagement section to lock the interface member to the wireless phone holster.

2. The wireless phone holster assembly of claim 1, wherein the interface member with T-shaped members is movable relative to the slotted engagement section to lock the interface member to the wireless phone holster.

3. The wireless phone holster assembly of claim 1, wherein at least one of the T-shaped members includes a catch to lock the interface member to the slotted engagement section when the T-shaped members are moved relative to the slotted engagement section.

4. The wireless phone holster assembly of claim 1, wherein the interface member is carried by the belt clip.

5. The wireless phone holster assembly of claim 1, wherein the interface member is carried by the wireless phone holster.

6. A detachable belt clip interface mechanism for attaching and detaching a wireless phone holster and wireless phone to and from a belt clip, wherein the wireless phone holster and the detachable belt clip interface mechanism are independent of the wireless phone, the detachable belt clip interface mechanism comprising:
    a slotted engagement section of a wireless phone holster;
    an interface member including protrusions configured for engaging the slotted engagement section to securely attach the engagement section of the wireless phone holster with wireless phone to the belt clip,
    wherein the slotted engagement section includes a pair of T-shaped slots in vertical alignment, and the protrusions of the interface member includes a pair of T-shaped members in vertical alignment that are received by the T-shaped slots to secure the interface member to the slotted engagement section, at least one of the T-shaped members includes a chamfer surface, and the engagement section includes a flexible resilient arm deflectable by the chamfer surface so as to cause the interface member with T-shaped members to move relative to the slotted engagement section to lock the interface member to the wireless phone holster.

7. The detachable belt clip interface mechanism of claim 6, wherein the interface member with T-shaped members is movable relative to the slotted engagement section to lock the interface member to the wireless phone holster.

8. The detachable belt clip interface mechanism of claim 7, wherein at least one of the T-shaped members includes a catch to lock the interface member to the slotted engagement section when the T-shaped members are moved relative to the slotted engagement section.

* * * * *